United States Patent
Kim et al.

(10) Patent No.: US 8,227,132 B2
(45) Date of Patent: Jul. 24, 2012

(54) DIRECT LIQUID FEED FUEL CELL STACK

(75) Inventors: Jin-ho Kim, Seoul (KR); Kyoung Hwan Choi, Suwon-si (KR); Hye-Jung Cho, Anyang-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1381 days.

(21) Appl. No.: 11/436,524

(22) Filed: May 19, 2006

(65) Prior Publication Data

US 2006/0280994 A1 Dec. 14, 2006

(30) Foreign Application Priority Data

Jun. 13, 2005 (KR) .................. 10-2005-0050498

(51) Int. Cl.
*H01M 8/24* (2006.01)
*H01M 8/10* (2006.01)
*H01M 2/40* (2006.01)

(52) U.S. Cl. ........ 429/467; 429/452; 429/455; 429/456; 429/458; 429/463

(58) Field of Classification Search .............. 429/38
See application file for complete search history.

(56) References Cited

U.S. PATENT DOCUMENTS

| 5,364,711 | A | * | 11/1994 | Yamada et al. ................ 429/15 |
| 6,030,718 | A | * | 2/2000 | Fuglevand et al. ............ 429/410 |
| 2002/0142205 | A1 | | 10/2002 | Kim et al. |
| 2005/0123815 | A1 | * | 6/2005 | Tsai et al. ........................ 429/27 |
| 2006/0228610 | A1 | * | 10/2006 | Shu et al. ........................ 429/34 |

FOREIGN PATENT DOCUMENTS

| CN | 1381917 A | 11/2002 |
| CN | 1564360 A | 1/2005 |
| JP | 2001-155761 | 6/2001 |
| JP | 2002-343378 | 11/2002 |
| JP | 2002-367663 | 12/2002 |
| JP | 2004-071414 | 3/2004 |
| JP | 2006-140007 | 6/2006 |

OTHER PUBLICATIONS

Certificate of Patent issued by the Chinese Patent Office in Chinese Patent No. 200610077193.6.
Japanese Office Action issued Nov. 10, 2009, in a corresponding Japanese patent application.

* cited by examiner

*Primary Examiner* — Robert Hodge
*Assistant Examiner* — Stephen Yanchuk
(74) *Attorney, Agent, or Firm* — Lee & Morse, P.C.

(57) ABSTRACT

A direct liquid feed fuel cell stack includes a first end plate and a second end plate facing each other, and a plurality of unit cell modules mounted between the first end plate and the second end plate, wherein an electrical circuit that contacts terminals of the unit cell modules is formed on an inner surface of the first end plate.

18 Claims, 7 Drawing Sheets

DIRECT LIQUID FEED FUEL CELL STACK

CROSS-REFERENCE TO RELATED APPLICATIONS

This application claims the benefit of Korean Patent Application No. 2005-50498, filed Jun. 13, 2005, in the Korean Intellectual Property Office, the disclosure of which is incorporated herein in its entirety by reference.

BACKGROUND OF THE INVENTION

1. Field of the Invention

Aspects of the present invention relate to a direct liquid feed fuel cell stack, and more particularly, to a direct liquid feed fuel cell stack having a detachable unit fuel cell module.

2. Description of the Related Art

A direct liquid feed fuel cell generates electricity by electrochemical reactions between an organic fuel, such as methanol or ethanol, and an oxidant, i.e., oxygen in the air. The electricity generated by the direct liquid feed fuel cell has a high specific energy density and current density. Also, since a liquid fuel such as methanol is fed directly to the cell, the direct feed fuel cell does not require a peripheral device such as a fuel reformer, and storing and supplying the liquid fuel is easy.

As depicted in FIG. 1, a unit cell of the direct feed fuel cell has a membrane electrode assembly (MEA) structure having an electrolyte membrane 1 interposed between an anode electrode 2 and a cathode electrode 3. The anode electrode 2 includes a diffusion layer 22 for supplying and diffusing fuel, a catalyst layer 21 at which oxidation reaction of the fuel occurs, and an electrode supporting layer 23. The cathode electrode 3 also includes a diffusion layer 32 for supplying and diffusing the fuel, a catalyst layer 31 at which reduction reaction occurs, and an electrode supporting layer 33.

An electrode reaction of a direct methanol fuel cell (DMFC), which is a type of direct liquid feed fuel cell, includes an anode reaction where fuel is oxidized and a cathode reaction where hydrogen and oxygen are reduced as described below.

[Reaction 1]

$$CH_3OH + H_2O \rightarrow CO_2 + 6H^+ + 6e^- \quad \text{(Anode reaction)}$$

[Reaction 2]

$$\tfrac{3}{2}O_2 + 6H^+ + 6e^- \rightarrow 3H_2O \quad \text{(Cathode reaction)}$$

[Reaction 3]

$$CH_3OH + \tfrac{3}{2}O_2 \rightarrow 2H_2O + CO_2 \quad \text{(Overall reaction)}$$

Carbon dioxide, hydrogen ions, and electrons are produced at the anode electrode 2 where the fuel is oxidized (reaction 1). The hydrogen ions migrate to the cathode electrode 3 through a hydrogen ion exchange membrane 1. At the cathode electrode 3, water is produced by the reduction reaction (reaction 2) between hydrogen ions, electrons transferred through an external circuit, and oxygen. Accordingly, water and carbon dioxide are produced as the result of the overall electrochemical reaction (reaction 3) between methanol and oxygen.

The theoretical voltage that can be generated by a unit cell of a DMFC is approximately 1.2V. However, the open circuit voltage at ambient temperature and atmospheric pressure falls below 1 V due to a voltage drop caused by activation overvoltage and ohmic overvoltage. In reality, the actual operating voltage lies in the range of 0.4~0.6V. Therefore, to obtain higher voltages, a plurality of unit cells are connected in series.

A direct liquid feed fuel cell stack is formed by electrically connecting several unit cells in series and assembling them into a stack. Adjacent unit cells are connected by a conductive bipolar plate 4 between the unit fuel cells. Flow channels 41 and 42 are formed on both sides of the bipolar plate 4, to supply liquid fuel and air to the contacting electrodes.

U.S. Patent Publication No. 2002/0142205 has disclosed a fuel cell stack structure in which a plurality of bipolar plates and MEAs are stacked in series. Unit cells of the fuel cell stack structure are coupled by screws.

However, the fuel cell stack coupled by screws must be unscrewed to replace any unit cell which malfunctions due to manufacturing failure or performance degradation. This activity is time consuming work.

SUMMARY OF THE INVENTION

Aspects of the present invention provide a direct liquid feed fuel cell stack structure that allows easy replacement of unit cells.

Aspects of the present invention also provide a direct liquid feed fuel cell stack having a simplified connection circuit for connecting the unit cells.

According to an aspect of the present invention, there is provided a direct liquid feed fuel cell stack comprising: a first end plate and a second end plate facing each other; and a plurality of unit cell modules mounted between the first end plate and the second end plate wherein an electrical circuit that contacts terminals of the unit cell modules is formed on an inner surface of the first end plate.

According to an aspect of the present invention, the unit cell module may comprise at least one unit cell, wherein each unit cell comprises: a membrane electrode assembly (MEA) having an anode electrode and a cathode electrode surrounding an electrolyte membrane; an anode plate located on the anode electrode and having a flow channel formed on an inner surface thereof, a terminal formed at a portion connected to the first end plate, and a liquid fuel inlet and a liquid fuel outlet formed at a portion connected to the second end plate; and a cathode plate located on the cathode electrode and having a plurality of holes, and a terminal formed at a portion connected to the first end plate.

According to an aspect of the present invention, the unit cell module may comprise two unit cells surrounding an insulation film, and the cathode plate of each of the unit cells may face outside.

According to an aspect of the present invention, the second end plate may comprise inlet holes and outlet holes respectively connected to the liquid fuel inlet and the liquid fuel outlet of the unit cell module, and an inlet manifold connected to the inlet holes and an outlet manifold connected to the outlet holes may be formed inside of the second end plate.

According to an aspect of the present invention, the electrical circuit may connect the unit cell modules in series.

According to an aspect of the present invention, the electrical circuit may further comprise a circuit that measures an output voltage of each of the unit cell modules.

According to an aspect of the present invention, the first and second end plates may comprise sliding grooves that allow the unit cell modules to be perpendicularly replaced from the first and second end plates.

According to an aspect of the present invention, the unit cell module comprises at least one unit cell, wherein each unit cell may comprise: a membrane electrode assembly (MEA)

having an anode electrode and a cathode electrode surrounding an electrolyte membrane; a wicking member located on the anode electrode; an anode plate located on the wicking member and having a terminal formed at a portion where the anode plate is connected to the first end plate; a cathode plate located on the cathode electrode and having a plurality of holes, and a terminal formed at a portion connected to the first end plate.

According to an aspect of the present invention, the second end plate comprises inlet holes contacting the wicking member, and an inlet manifold connected to the inlet holes is formed inside of the second end plate.

According to an aspect of the present invention, the inlet manifold may be filled with a foam member.

According to another aspect of the present invention, there is provided a unit cell module of a direct liquid feed fuel cell stack, wherein the unit cell module has a first end portion and a second end portion and comprises at least one unit cell, wherein each unit cell comprises a membrane electrode assembly (MEA) having an anode electrode and a cathode electrode surrounding an electrolyte membrane; an anode plate located on the anode electrode and having a flow channel formed on an inner surface thereof, a anode terminal formed at the first end portion of the unit fuel cell module, and a liquid fuel inlet and/or a liquid fuel outlet formed at the second end portion of the unit fuel cell module; and a cathode plate located on the cathode electrode and having a plurality of holes and a cathode terminal formed at the first end portion of the unit fuel cell module, wherein the first end portion slidably and removably engages a first end plate of the direct liquid feed fuel cell stack to provide an electrical connection of the anode terminal and cathode terminal of each unit cell with the first end plate, and wherein the second end portion slidably and removably engages a second end plate of the direct liquid feed fuel stack to provide a fluid connection of the liquid fuel inlet and/or liquid fuel outlet of each unit cell with the second end plate Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
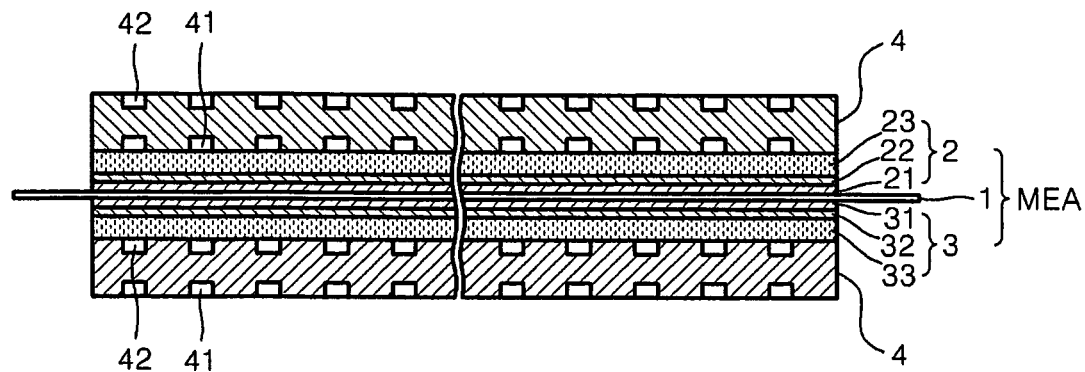
FIG. 1 is a cross-sectional view of the basic configuration of a direct liquid feed fuel cell.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
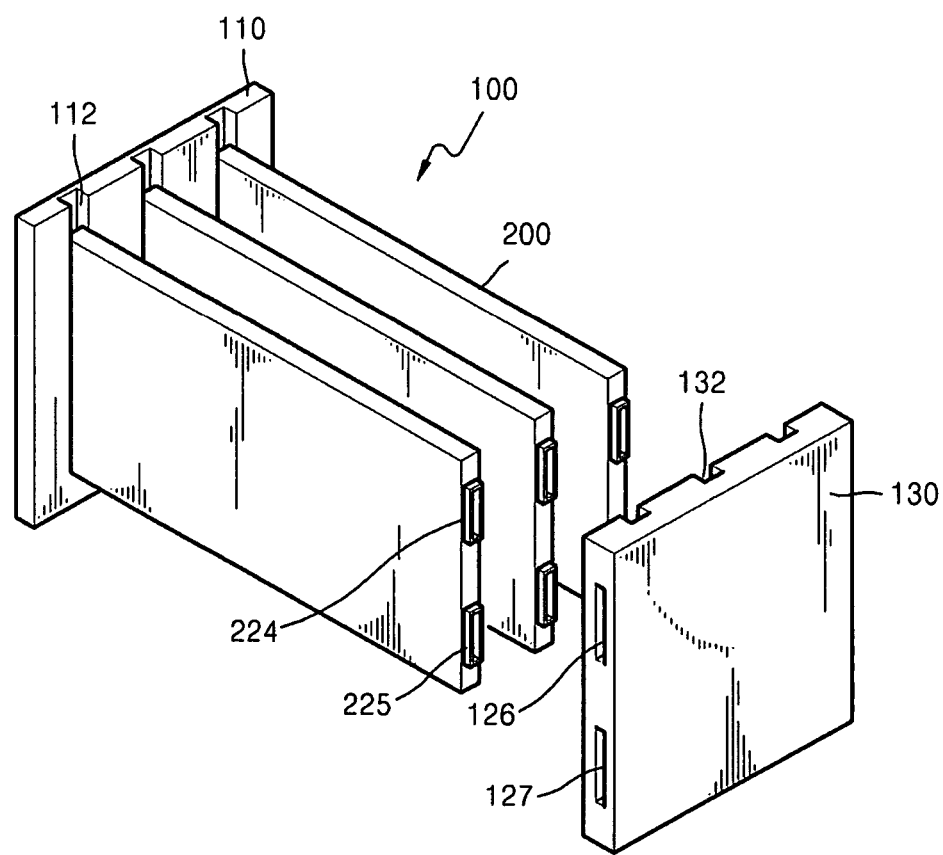
FIG. 2 is a schematic perspective view of a direct liquid feed fuel cell stack according to an embodiment of the present invention.

FIG. 2 is a schematic perspective view of a direct liquid feed fuel cell stack 100 according to an embodiment of the present invention. The direct liquid feed fuel cell stack 100 includes a first end plate 110 and a second end plate 130 parallel to each other, and a plurality of unit cell modules 200 between the first and second end plates 110 and 130. The unit cell modules 200 are mounted perpendicular to the first and second end plates 110 and 130. The first and second end plates 110 and 130 include a plurality of grooves 112 and 132 allowing easy mounting and dismounting of the unit cell modules 200. The unit cell modules 200 can be mounted and dismounted in a vertical direction. Although FIG. 2 shows the first end plate 110 and second end plate 130 as parallel to each other and the plurality of unit cell modules as perpendicular to the first and second end plates 110 and 130, the direct liquid feed fuel cell stack 100 is not limited to this configuration.

Figure 3:
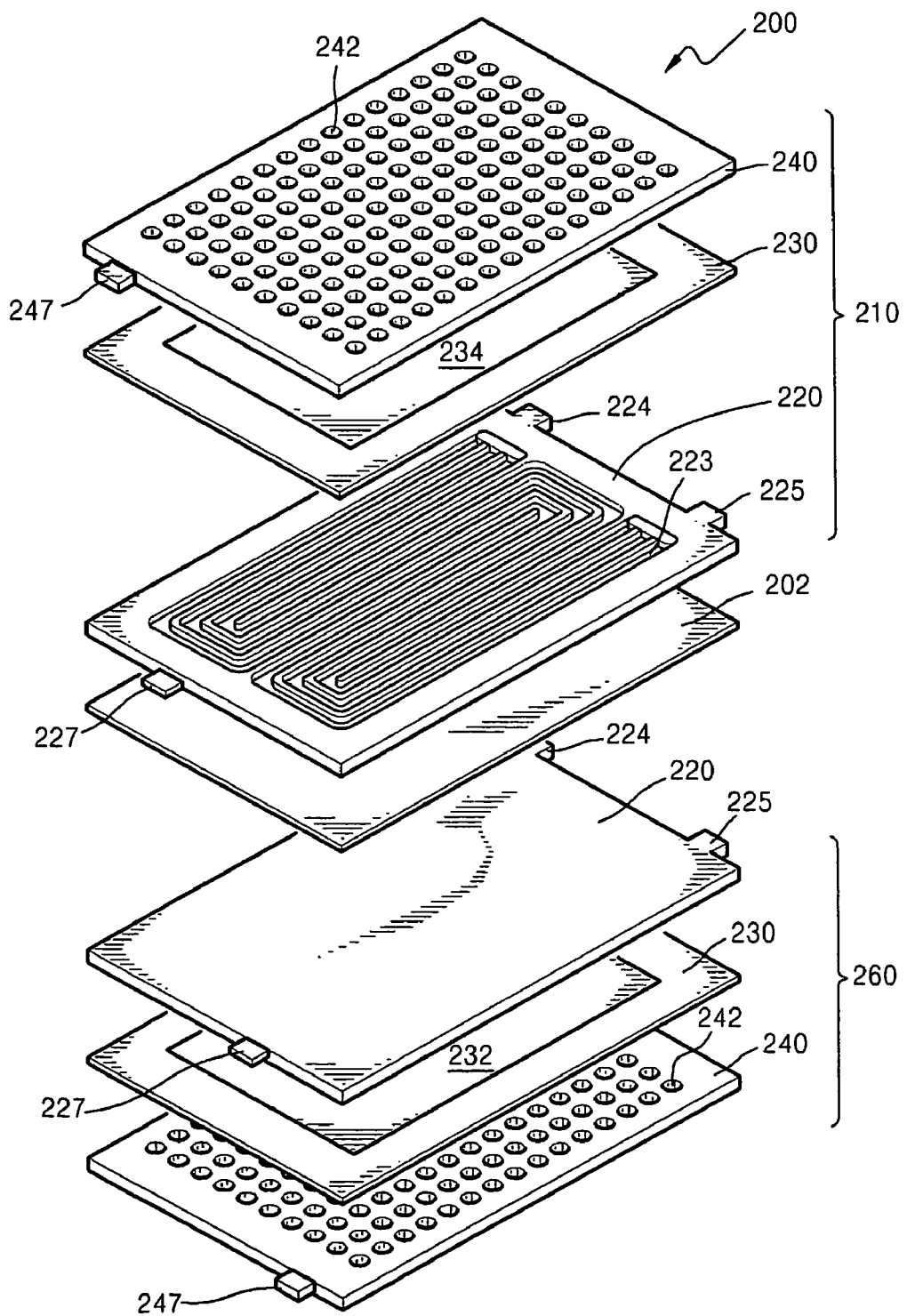
FIG. 3 is an exploded perspective view of the unit cell module of the direct liquid feed fuel cell stack of FIG. 2.
Figure 4:
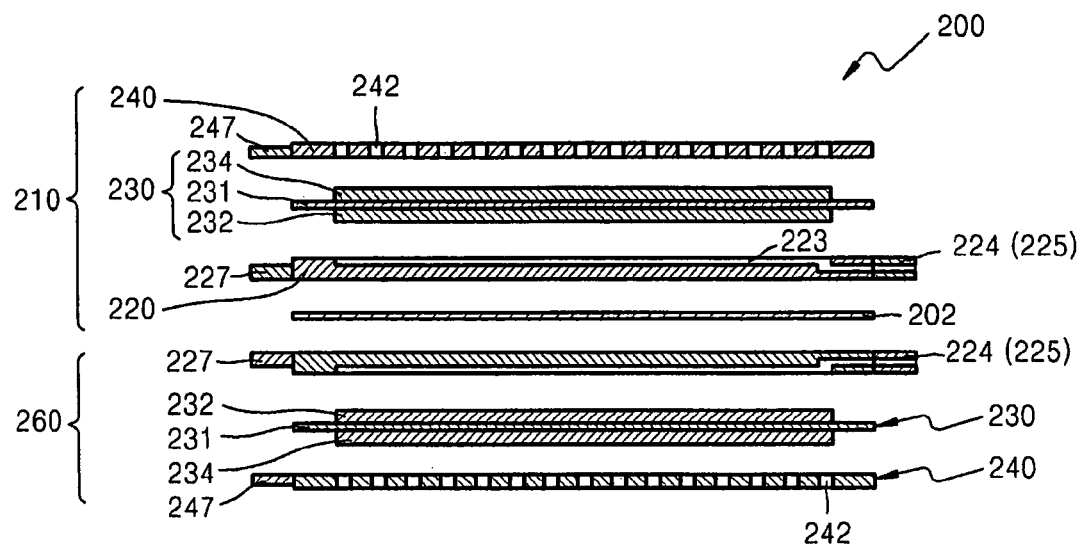
FIG. 4 is an exploded cross-sectional view of a unit cell module of the direct liquid feed fuel cell stack of FIG. 2.

FIGS. 3 and 4 are an exploded perspective view and an exploded cross-sectional view of a unit cell module 200 of the direct liquid feed fuel cell stack 100. The unit cell module 200 includes first and second unit cells 210 and 260 surrounding an insulation film 202. Each of the unit cells 210 and 260 includes an anode electrode 232 on one surface of an electrolyte membrane 230, a cathode electrode 234 on the other surface of the electrolyte membrane 230, a conductive anode plate 220 on the anode electrode 232, and a conductive cathode plate 240 on the cathode electrode 234.

A terminal 227 is formed on a side of the anode plate 220 contacting the first end plate 110, and a flow channel 223 is formed on a surface of the anode plate 220 facing the anode electrode 232. A liquid fuel inlet 224 and a liquid fuel outlet 225 connected to the flow channel 223 are formed at the side of the anode plate 220 contacting the second end plate 130.

The cathode plate 240 includes a plurality of holes 242 through which external air enters the cathode electrode 234. The cathode plate 240 is mounted facing outside so that external air can pass through.

The configuration of the second unit cell 260 is substantially identical to the first unit cell 210. Thus, like reference numerals refer to like elements, and the description thereof will not be repeated.

In FIGS. 3 and 4, the unit cell module 200 having two unit cells 210 and 260 is described, but the present invention is not limited thereto. That is, the unit cell module 200 may include one unit cell.

Figure 5:
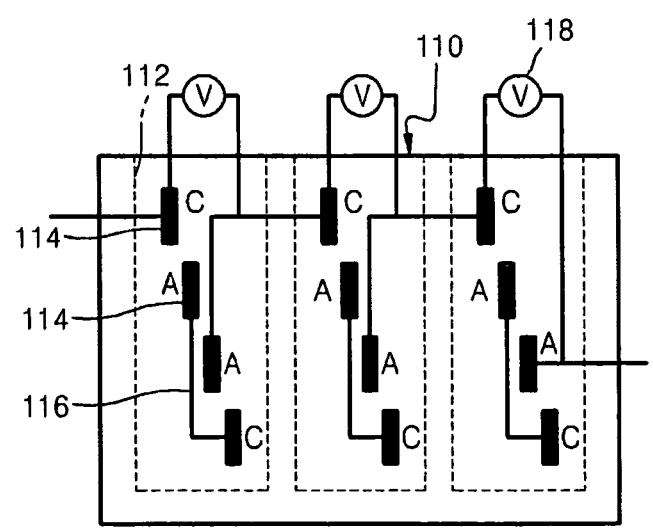
FIG. 5 is a lateral view of an inner side of a first end plate of the direct liquid feed fuel cell stack of FIG. 2

FIG. 5 is a lateral view of an inner side of the first end plate 110 of the direct liquid feed fuel cell stack 100. The first end plate 110 can be formed of a non-conductive material, such as plastic. Grooves 112 having a predetermined depth are formed on the inner surface of the first end plate 110 to vertically mount the unit cell modules 200. The groove region includes pads 114 for contacting a terminal 247 of the cathode plate 240 and the terminal 227 of the anode plate 220 of the first unit cell 210, and the terminal 247 of the cathode plate 240 and the terminal 227 of the anode plate 220 of the second unit cell 260. The pads 114 are connected in series through circuit lines 116. The circuit lines 116 electrically connect the anode electrode 232 of one unit cell to the cathode electrode 234 of a neighboring unit cell. The circuit lines 116 and the pads 114 can be formed using conventional semiconductor techniques.

A circuit line 118 is formed on the first end plate 110 to measure an output voltage between the terminal 247 of the first unit cell 210 and the terminal 227 of the second unit cell 260. By measuring each of the unit cell modules 200, any unit cell module 200 which needs to be replaced can be identified.

In FIG. 5, three unit cell modules 200 connected in series are shown, but the present invention is not limited thereto. That is, a direct liquid feed fuel cell stack 100 may include more than three or less than three unit cell modules 200 and various circuits can be configured by connecting the unit cells in parallel or in series.

Figure 6:
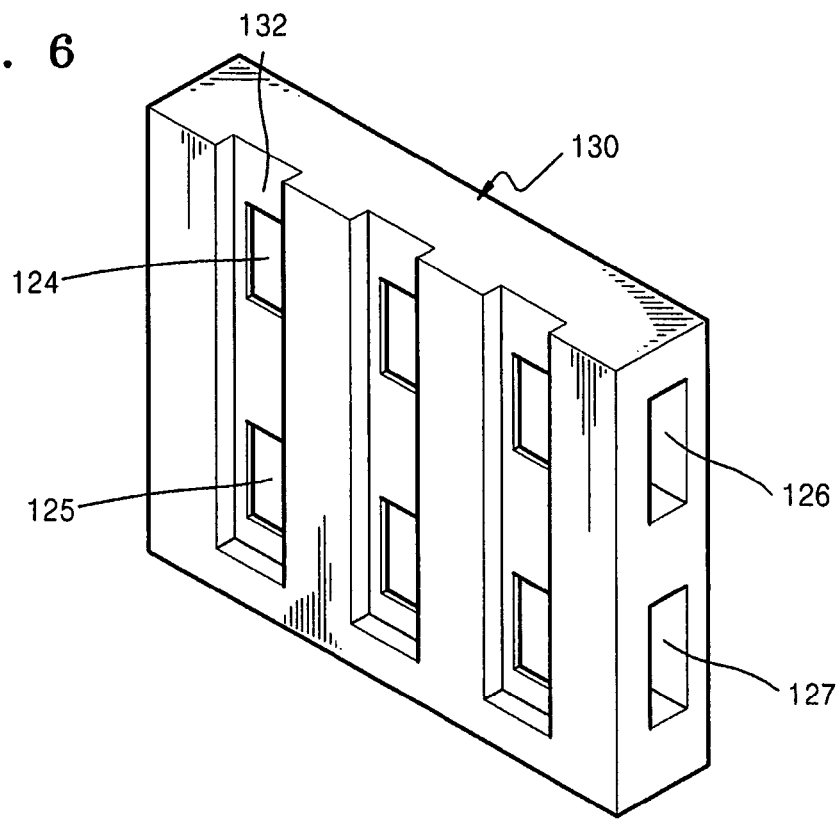
FIG. 6 is a perspective view of a second end plate of the direct liquid feed fuel cell stack of FIG. 2.

FIG. 6 is a perspective view of the second end plate 130 of the direct liquid feed fuel cell stack 100. The second end plate 130 can include grooves 132 having a predetermined depth so that the unit cell modules 200 can be vertically mounted on the second end plate 130. Each groove region includes an inlet hole 124 and an outlet hole 125 to which the liquid fuel inlet 224 and the liquid fuel outlet 225 of the anode plate 220 of the first and second unit cells 210 and 260 are respectively connected. An inlet manifold 126 connected to the inlet holes 124 and an outlet manifold 127 connected to the outlet holes 125 are formed inside the second end plate 130. The inlet manifold 126 and the outlet manifold 127 are connected to a water pump (not shown). The connection between the liquid fuel inlet 224 and the inlet holes 124 of the first and second unit cell 210 and 260 can be structured in various ways. For example, two liquid fuel inlets 224 can be inserted into one inlet hole 124, or a connection member (not shown) having a hole that connects two liquid fuel inlets 224 of the unit cells 210 and 260 can be additionally used, and the connection member can be inserted into one inlet hole 124. The same connection structure can be applied to the connection between the liquid fuel outlets 225 and the outlet holes 125.

Figure 7:
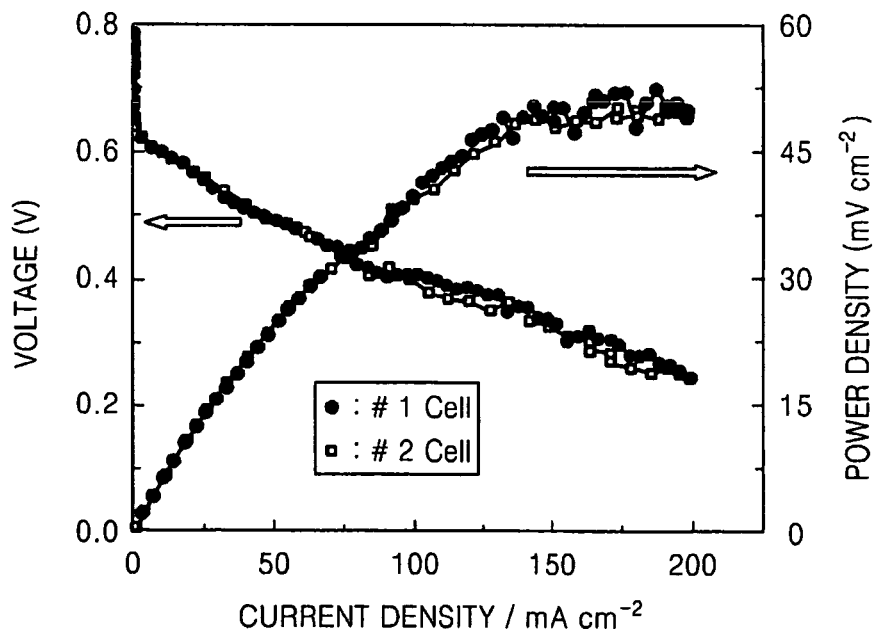
FIG. 7 is a graph showing performance curves of first and second unit cells of a unit cell module of the direct liquid feed fuel cell stack of FIG. 2.

FIG. 7 is a graph showing performance curves of first and second unit cells of the unit cell module 200 of the direct liquid feed fuel cell stack 100. The test was performed using a unit cell module having an area of 18.5 cm$^2$, and the flowrate of 1 M methanol at each fuel inlet was 0.3 cc/min. The results show that the performances of the first and second unit cells are similar to each other.

Figure 8:
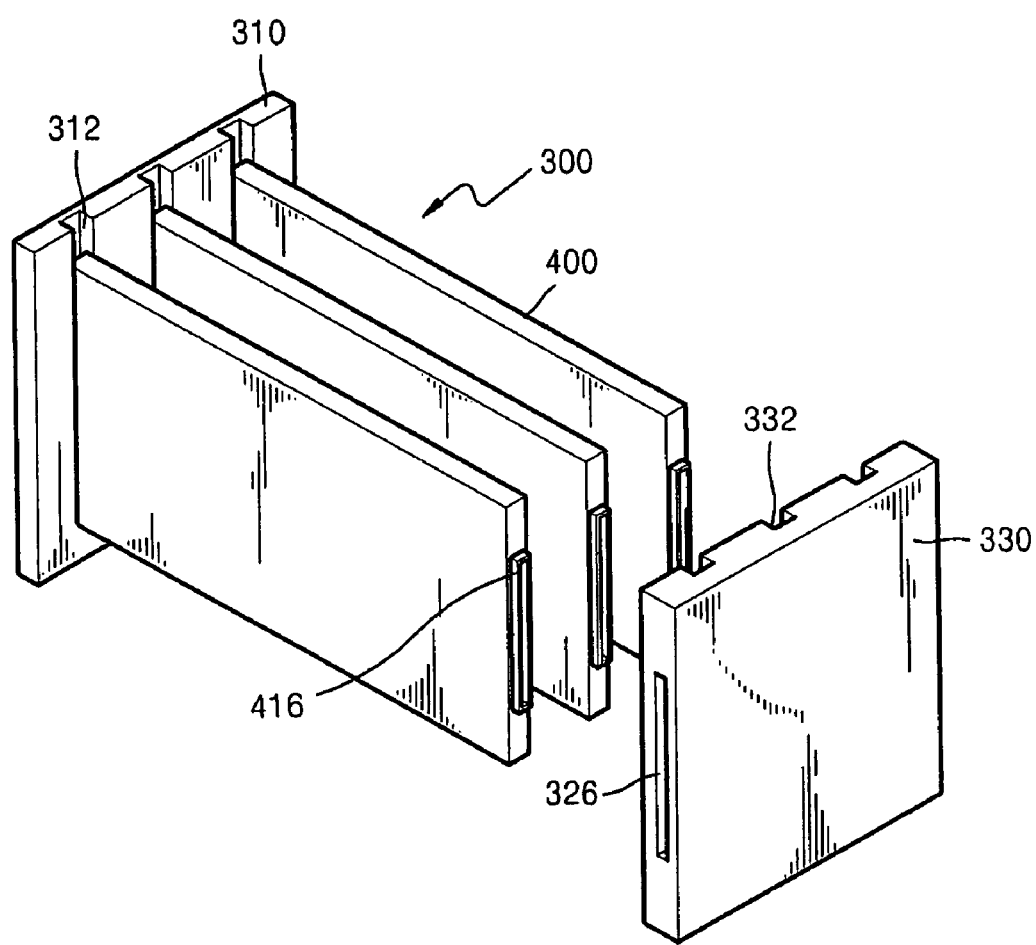
FIG. 8 is a schematic perspective view of a direct liquid feed fuel cell stack according to another embodiment of the present invention.

FIG. 8 is a schematic perspective view of a direct liquid feed fuel cell stack 300 according to another embodiment of the present invention. The direct liquid feed fuel cell stack 300 includes first and second end plates 310 and 330 parallel and separated from each other and a plurality of unit cell modules 400 between the first and second end plates 310 and 330. The unit cell modules 400 are mounted perpendicular to the first and second end plates 310 and 330. The first and second end plates 310 and 330 include a plurality of vertical grooves 312 and 332 to allow easy mounting and dismounting of the unit cell modules 400. The unit cell modules 400 can be mounted and dismounted in a vertical direction.

Figure 9:
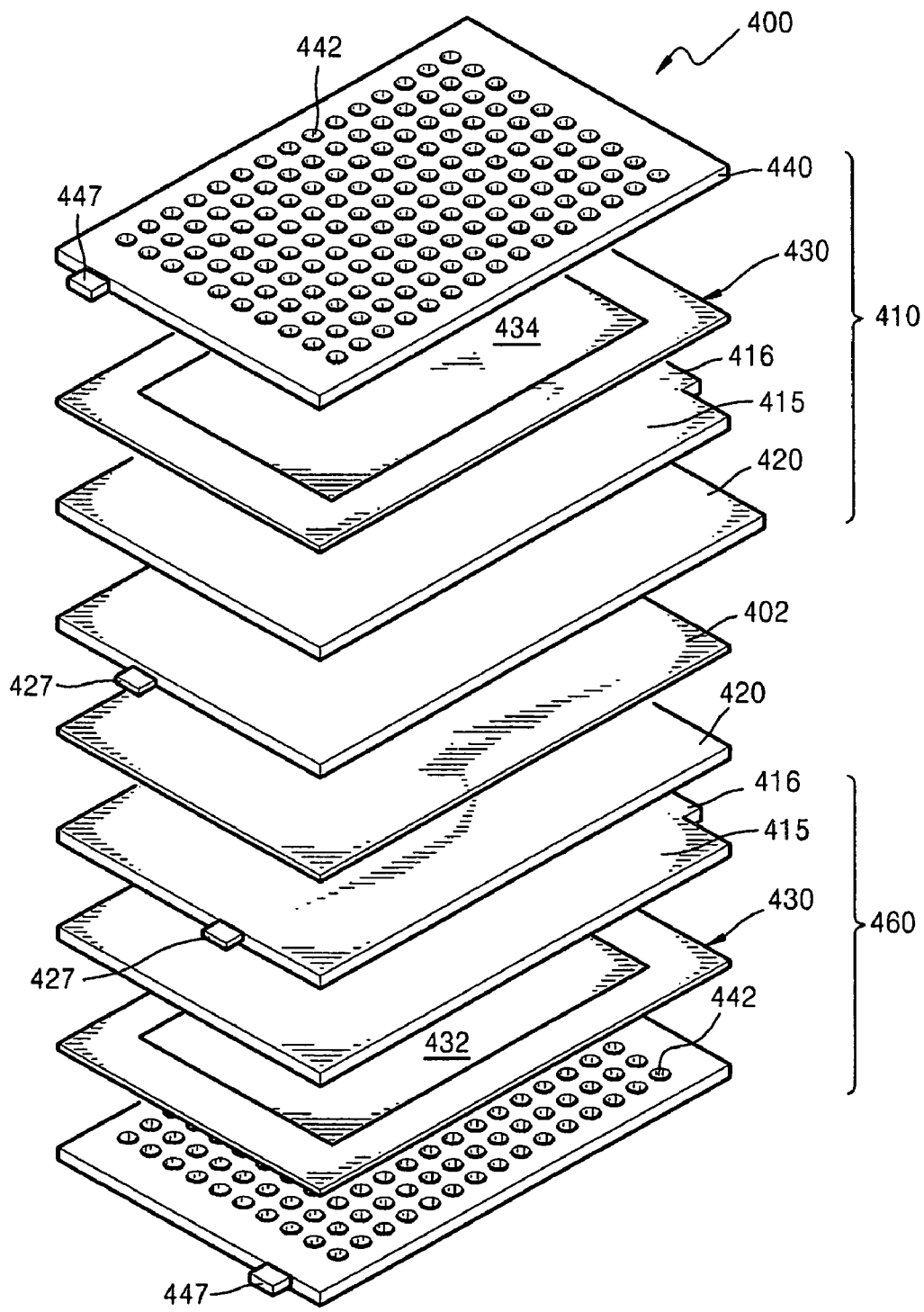
FIG. 9 is an exploded perspective view of a unit cell module of the direct liquid feed fuel cell stack of FIG. 8.
Figure 10:
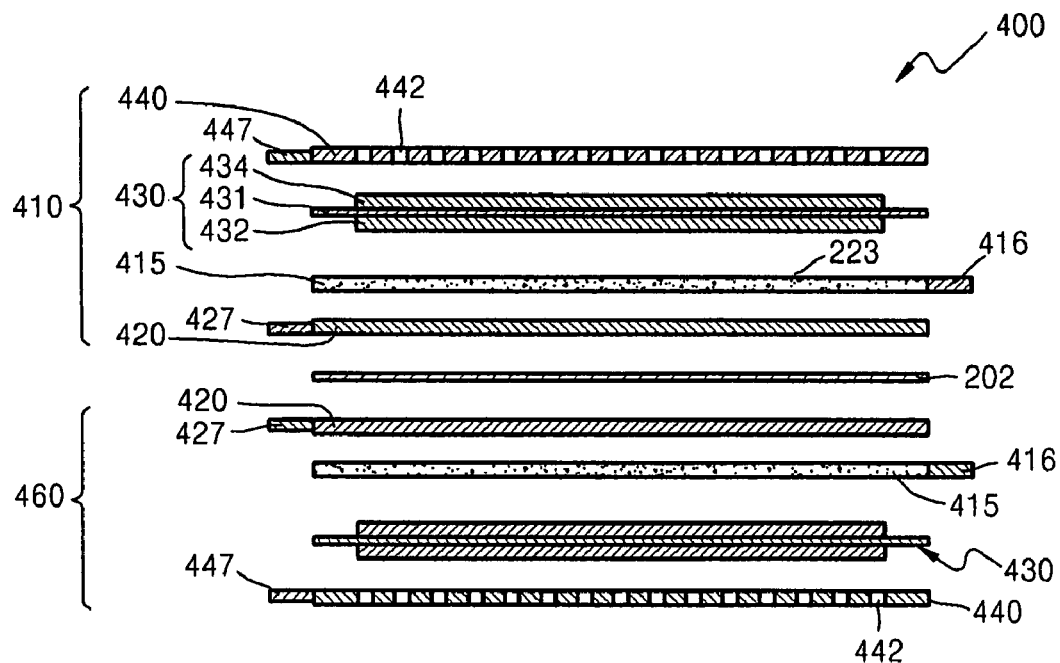
FIG. 10 is an exploded cross-sectional view of a unit cell module of the direct liquid feed fuel cell stack of FIG. 8.

FIGS. 9 and 10 are an exploded perspective view and an exploded cross-sectional view of a unit cell module 400 of the direct liquid feed fuel cell stack 300. The unit cell module 400 includes first and second unit cells 410 and 460 surrounding an insulation film 402. Each of the unit cells 410 and 460 includes an anode electrode 432 on one surface of an electrolyte membrane 431, a cathode electrode 434 on the other surface of the electrolyte membrane 432, a wicking member 415 and a conductive anode plate 420 on the anode electrode 432, and a conductive cathode plate 440 on the cathode electrode 434.

A terminal 427 is formed on a side of the anode plate 420 contacting the first end plate 310.

The wicking member 415 supplies liquid fuel to the anode electrode 432 by diffusion by receiving the liquid fuel through an inlet portion 416. The wicking member 415 can be formed of foam.

A plurality of holes 442 are formed in the cathode plate 440, and external air is supplied to the cathode electrode 434 through the holes 442 of the cathode plate 440. The cathode plate 440 is mounted facing outside so that external air can pass through.

The configuration of the second unit cell 460 is substantially identical to the first unit cell 410. Thus, like reference numerals refer to like elements, and the description thereof will be omitted.

In FIGS. 9 and 10, the unit cell module 400 having two unit cells 410 and 460 is described, but the present invention is not limited thereto. That is, the unit cell module 400 may include one unit cell.

The configuration of first end plate 310 of the direct liquid feed fuel cell stack 300 is substantially identical to the end plate 110 of the direct liquid feed fuel cell stack 100. Thus, like reference numerals refer to like elements, and the description thereof will not be repeated.

Figure 11:
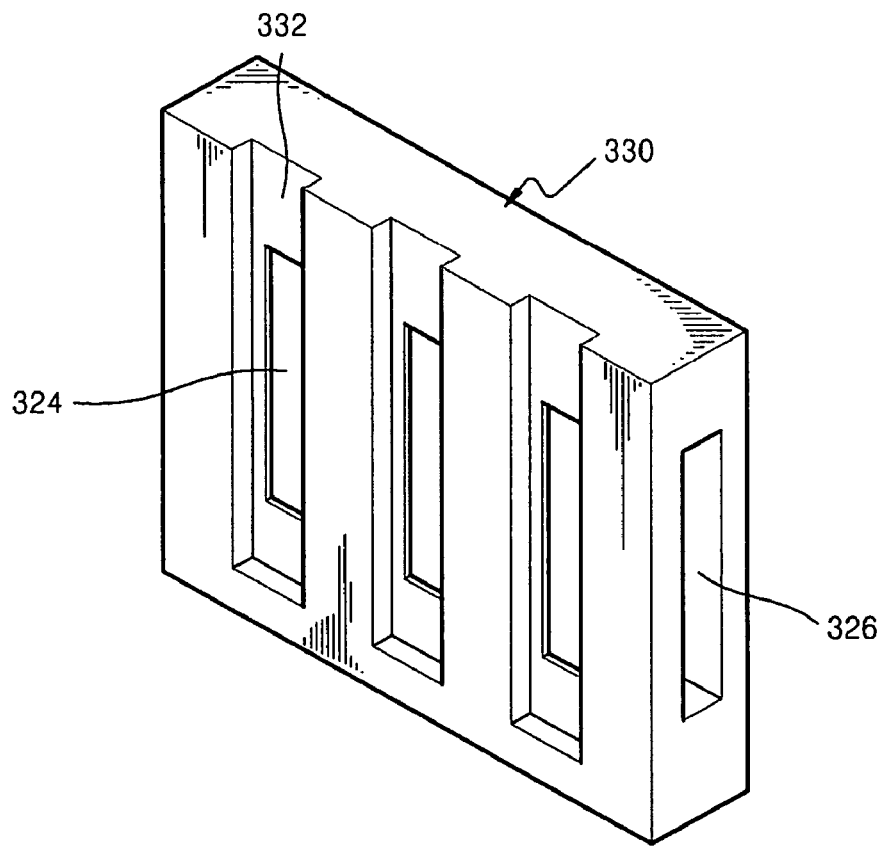
FIG. 11 is a perspective view of a second end plate of the direct liquid feed fuel cell stack of FIG. 8.

FIG. 11 is a perspective view of a second end plate 330 of the direct liquid feed fuel cell stack 300. The second end plate 330 can include grooves 332 having a predetermined depth so that the unit cell modules 400 can be vertically mounted. Each groove region includes an inlet hole 324 to which the inlet portion 416 of the wicking member 415 of each of the first and second unit cells 410 and 460 is connected. An inlet manifold 326 connected to the inlet holes 324 is formed inside the second end plate 330. The inlet manifold 326 may be filled with another wicking member (not shown). The inlet manifold 326 receives liquid fuel from a fuel cartridge (not shown). The inlet portion 416 of the first and second unit cells 410 and 460 and the inlet holes 324 can be connected in various ways, thus, the detailed description will be omitted.

As described above, the direct liquid feed fuel cell stack according to an aspect of the present invention includes a plurality of unit cell modules that can be readily mounted and dismounted. Therefore, a unit cell module having degraded performance can be easily replaced.

Also, a circuit that connects the unit cell modules can be readily formed on an end plate.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A direct liquid feed fuel cell stack comprising:
   a first end plate and a second end plate facing each other; and
   a plurality of unit cell modules removably mounted between inner surfaces of the first and the second end plates, the plurality of unit cells modules including at least one unit cell, and each unit cell including an electrolyte membrane surrounded by an anode electrode and a cathode electrode, wherein:

the inner surfaces of the first and second end plates comprise sliding grooves configured to slidably install the unit cell modules into the first and second end plates in such a manner where a planar face of the unit cell is substantially perpendicular to planar faces of the first and second end plates and to slidably remove the unit cell modules from the first and second end plates, the sliding grooves on the inner surface of the first end plate include therein pads configured to contact terminals of the unit cell modules, the pads being electrically connected in series by circuit lines of an electrical circuit arranged in a region of the sliding grooves of the first end plate, the sliding grooves on the inner surface of the second end plate include therein ports to contact liquid fuel inlets and liquid fuel outlets of the unit cell modules, the unit cell is contained within a solid case and has an electrical terminal in direct contact with one sliding groove of the first end plate, and one liquid fuel inlet and one liquid fuel outlet arranged at a portion of the anode plate are in direct contact with one sliding groove of the second end plate, and at least one circuit line connects an anode electrode of one unit cell in one of the plurality of unit cell modules to a cathode electrode of one unit cell in an adjacent one of the plurality of unit cell modules.

2. The direct liquid feed fuel cell stack of claim 1, wherein: each unit cell comprises:
   a membrane electrode assembly (MEA) including the electrolyte membrane, the anode electrode, and the cathode electrode;
   the anode plate located on the anode electrode and having a flow channel formed on an inner surface thereof, a terminal formed at a portion of the anode plate being connected to the first end plate; and
   a cathode plate located on the cathode electrode and having a plurality of holes, the electrical terminal formed at a portion of the cathode plate being connected to the first end plate.

3. The direct liquid feed fuel cell stack of claim 2, wherein: the unit cell module comprises two unit cells surrounding an insulation film, and
the cathode plate of each of the unit cells faces toward an outside of the unit cell module.

4. The direct liquid feed fuel cell stack of claim 2, wherein: the second end plate comprises inlet holes and outlet holes respectively connected to the liquid fuel inlet and the liquid fuel outlet of the unit cell module, and
an inlet manifold connected to the inlet holes and an outlet manifold connected to the outlet holes are formed inside the second end plate.

5. The direct liquid feed fuel cell stack of claim 2, wherein the circuit lines in the electrical circuit measure output voltages in the plurality of unit cell modules.

6. The direct liquid feed fuel cell stack of claim 1 wherein: the circuit lines in the electrical circuit measure output voltages in the plurality of unit cell modules, and
the circuit lines include the at least one circuit line that connects the anode electrode of the one unit cell in the one of the plurality of unit cell modules to the cathode electrode of one unit cell in the adjacent one of the plurality of unit cell modules and include another circuit line that connects an anode electrode of another unit cell in the one of the plurality of unit cell modules to a cathode electrode of the one unit cell in the one of the plurality of unit cell modules.

7. The direct liquid feed fuel cell stack of claim 1, wherein: each unit cell comprises:
   a membrane electrode assembly (MEA) including the electrolyte membrane, the anode electrode, and the cathode electrode;
   a wicking member located on the anode electrode;
   the anode plate located on the wicking member and having a terminal formed at a portion where the anode plate is connected to the first end plate;
   a cathode plate located on the cathode electrode and having a plurality of holes, the electrical terminal formed at a portion being connected to the first end plate.

8. The direct liquid feed fuel cell stack of claim 7, wherein: the unit cell module comprises two unit cells surrounding an insulation film, and
the cathode plate of each of the unit cells faces toward an outside of the unit cell module.

9. The direct liquid feed fuel cell stack of claim 7, wherein: the second end plate comprises inlet holes contacting the wicking member, and an inlet manifold connected to the inlet holes is inside of the second end plate.

10. The direct liquid feed fuel cell stack of claim 9, wherein the inlet manifold is filled with a foam member.

11. The direct liquid feed fuel cell stack of claim 7, wherein the circuit lines in the electrical circuit measure output voltages in the plurality of unit cell modules.

12. The direct liquid feed fuel cell stack of claim 7, wherein:
   the circuit lines in the electrical circuit measure output voltages in the plurality of unit cell modules, and
   the circuit lines include the at least one circuit line that connects the anode electrode of the one unit cell in the one of the plurality of unit cell modules to the cathode electrode of one unit cell in the adjacent one of the plurality of unit cell modules and include another circuit line that connects an anode electrode of another unit cell in the one of the plurality of unit cell modules to a cathode electrode of the one unit cell in the one of the plurality of unit cell modules.

13. The direct liquid feed fuel stack of claim 1, wherein the first end plate and the second end plate are parallel to each other.

14. A unit cell module of a direct liquid feed fuel cell stack and disposed between inner surfaces of first and second end plates of the direct liquid feed fuel cell stack, the unit cell module comprising:
   a first end portion, a second end portion, and a plurality of unit cells, each unit cell comprising:
      a membrane electrode assembly (MEA) having an anode electrode and a cathode electrode surrounding an electrolyte membrane;
      an anode plate located on the anode electrode and having a flow channel formed on an inner surface thereof, an anode terminal formed at the first end portion of the unit fuel cell module, and a liquid fuel inlet and a liquid fuel outlet formed at the second end portion of the unit fuel cell module; and
      a cathode plate located on the cathode electrode and having a plurality of holes and a cathode terminal formed at the first end portion of the unit fuel cell module, wherein:
   the anode terminal, the cathode terminal, the liquid fuel inlet, and the liquid fuel outlet of each unit cell are configured to be removably inserted into sliding grooves on the inner surfaces of the first and second end plates and are configured to be slidably installed into in such a manner where a planar face of the unit cell is substantially perpendicular to planar faces of the first and second end plates and to be slidably removed from the sliding grooves, the sliding grooves on the inner surface of the second end plate include therein ports to contact the liquid fuel inlet and the liquid fuel outlet, the anode and cathode terminals of each unit cell slidably and removably directly contact the sliding groove on the inner surface of the first end plate of the direct liquid feed fuel cell stack to provide an electrical connection of the anode terminal and cathode terminal of each unit cell with the first end plate, the first end portion of the unit cell module being connected to an electrical circuit arranged in the region of the sliding groove of the first end plate, the liquid fuel inlet and the liquid fuel outlet of each unit cell slidably and removably directly contact the sliding groove on the inner surface of the second end plate of the direct liquid feed fuel stack to provide a fluid connection of the liquid fuel inlet and/or and liquid fuel outlet of the at least one unit cell with the second end plate, and an anode electrode of one unit cell in the unit cell module is electrically connected in series by a circuit line of the electrical circuit to a cathode electrode of another unit cell in the unit cell module.

15. The unit cell module of claim 14, wherein the anode terminal, the cathode terminal, the liquid fuel inlet, and the liquid fuel outlet protrude from sides of the unit cell module and are configured to be removably inserted into the corresponding sliding grooves having a predetermined depth to receive the terminals and liquid fuel inlets, and liquid fuel outlets.

16. The unit cell of claim 1, wherein:
the terminals of the unit cell modules and liquid fuel inlets, and liquid fuel outlets of the unit cell modules protrude from sides of the unit cell modules and are configured to be removably inserted into the corresponding sliding grooves of the first and second end plates, and the sliding grooves of the first and second end plates have a predetermined depth to receive the corresponding terminals and liquid fuel inlets, and liquid fuel outlets.

17. The direct liquid feed fuel cell stack of claim 1, wherein the sliding grooves on the inner surface of the second end plate include inlets and outlets ports for liquid fuel connected to the unit cell modules.

18. The direct liquid feed fuel cell stack of claim 1, wherein the sliding grooves on the inner surfaces of the first and second end plates are disposed parallel to a direction of slidably installing and slidably removing the unit cell modules.

* * * * *